United States Patent

Theuerman et al.

Patent Number: 5,959,736
Date of Patent: Sep. 28, 1999

[54] METHOD AND ARRANGEMENT FOR DETERMINING THE COLOR-TYPE OF A TEST SUBJECT

[76] Inventors: Krista Theuerman, Kaiserfeldgasse 8; Helmut Schöllenbauer, Sauraugasse 14, both of Leoben, Austria, A-8700

[21] Appl. No.: 09/041,181

[22] Filed: Mar. 12, 1998

Related U.S. Application Data

[63] Continuation of application No. PCT/AT96/00165, Sep. 18, 1996.

[30] Foreign Application Priority Data

Sep. 20, 1995 [AT] Austria ................................. 507/95 U

[51] Int. Cl.$^6$ ....................................................... G01J 3/52
[52] U.S. Cl. ............................................. 356/402; 356/421
[58] Field of Search ................................... 356/402, 403, 356/421, 425

[56] References Cited

U.S. PATENT DOCUMENTS

| | | | |
|---|---|---|---|
| 4,258,478 | 3/1981 | Scott et al. | 434/94 |
| 4,681,546 | 7/1987 | Hart | 434/99 |
| 4,909,632 | 3/1990 | McFarlane | 356/402 |
| 5,311,293 | 5/1994 | MacFarlane | 356/421 |

FOREIGN PATENT DOCUMENTS

| | | |
|---|---|---|
| 0682236 | 11/1995 | European Pat. Off. . |
| 1347400 | 1/1963 | France . |
| 2546624 | 11/1984 | France . |
| WO95/03727 | 2/1995 | WIPO . |

*Primary Examiner*—F. L. Evans
*Attorney, Agent, or Firm*—Jacobson, Price, Holman & Stern, PLLC

[57] ABSTRACT

The invention concerns a method of determining the color-type of a test subject, wherein a selection is made on the basis of a mixed color according to the amount of primary color portions present therein. The color-type of the test subject is determined several times in a plurality of steps in each of which the color comprising different primary color portions is used in at least three graduations or shades determined in each case in dependence on the preceding step. The invention also concerns an arrangement for determining the color-type of a test subject, said arrangement comprising a device for preparing or generating different shades of the mixed color with different primary color portions and a keyboard for inputting and a computer for evaluating the selection of the desired shade.

17 Claims, 1 Drawing Sheet

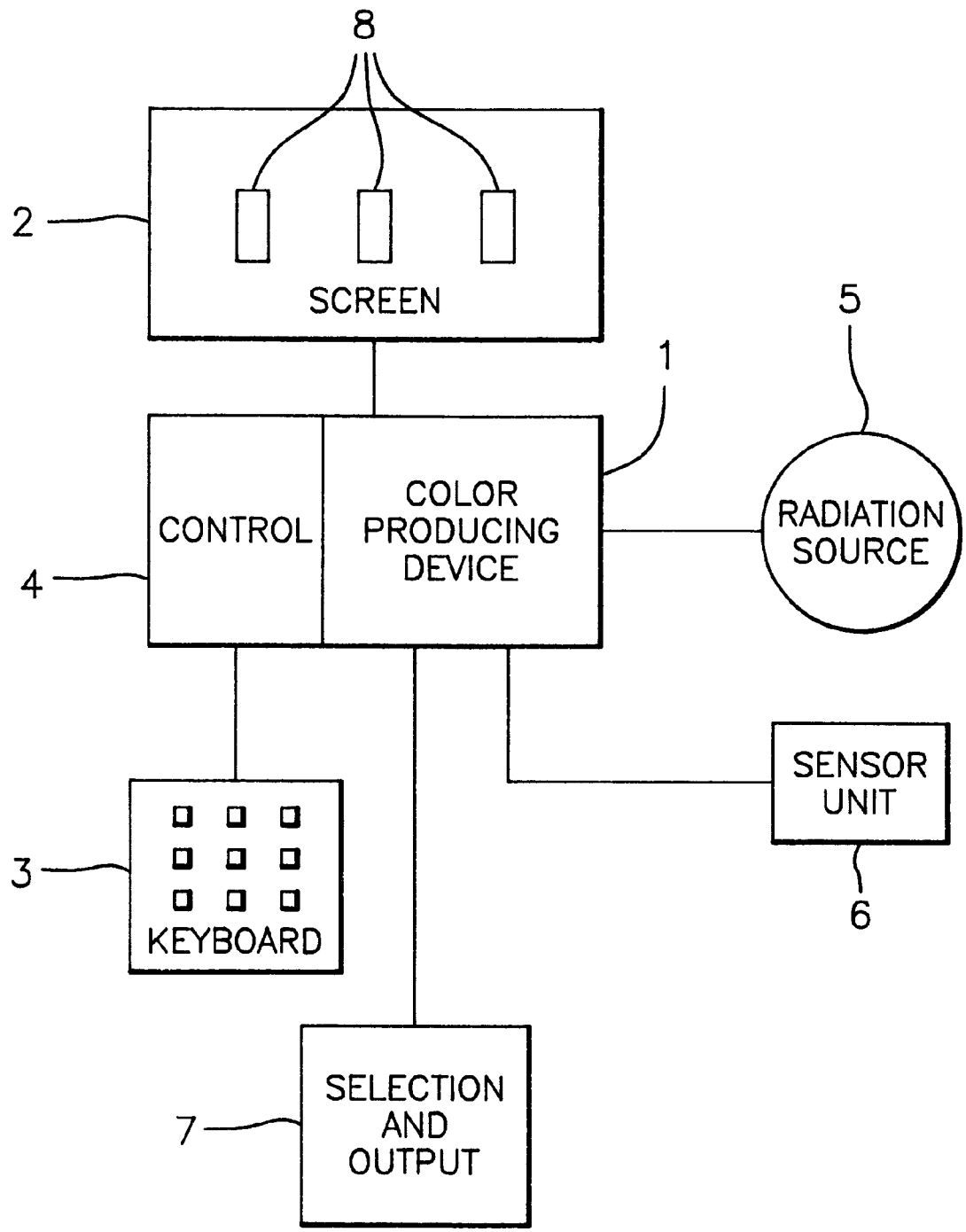

METHOD AND ARRANGEMENT FOR DETERMINING THE COLOR-TYPE OF A TEST SUBJECT

This application is a continuation application of Ser. No. PCT/AT96/00165, filed Sep. 18, 1996.

BACKGROUND OF THE INVENTION

1. Field of the Invention

The present invention relates to a method for determining the color type of a test subject by making a selection on the basis of a mixed color by way of the amount of primary color portions contained therein and determining the color type of the test subject as well as an arrangement for determining the color type of a test subject for carrying out such a method.

2. Prior Art

It has been generally known for quite some time that there is a connection between the natural skin coloration of a person and the colors that are appealing to the person concerned, inducing an accordingly pleasant feeling in that person. Since the natural color sensation is, however, differently strongly pronounced in men, which may be due, for instance, to a number of environmental influences, it does happen more and more frequently that such an inherently natural color sensation is not sufficiently emphasized, thus choosing colors, for instance, for hair, accessories or clothing, that are generally regarded as disadvantageous or unfavorable to the look of the person concerned, in particular, with respect to his/her skin color or tone. The responsibility of the different look of a person's skin rests with what is called successive contrast, such a sensation of contrasts of the eye usually causing the counter color of, for instance, the hair or clothing, i.e., in general, the color surrounding the skin to be seen more intensively on the skin. It is, furthermore, generally known that the different types of skin substantially are brought about by the portion of hemoglobin or carotene, which results in accordingly different skin types referred to, for instance, as warm types or cold types depending on whether the portion of carotene or yellow portion or whether the portion of hemoglobin or blue portion is predominant in the respective case.

In connection with the assessment of skin types various methods and techniques have already been known, which are used to a considerable extent, for instance, in the body, face or even hair cosmetics industries. A known method tries to find out the respective pigment or color portions of the skin by using, for instance, gold and silver colors or shadings in order to give recommendations on that base, for instance, with a view to makeups or hair colors to be used. Further known methods are based on the use of so-called color palettes, employing different tones or depths of colors each of a plurality of colors and asking the person concerned or test subject to determine the respective color tones from a plurality of different colors. However, on account of personal preferences, it frequently happens in such color selection processes that contrary color tones, i.e., color tones corresponding to different color types are each selected for different colors, thus making such a process not only time-consuming but often also to be completed without definite results. Other known methods for determining the skin or color type based, for instance, on the distribution or application of different colors on skin parts as well as the reaction of the skin likewise involve considerable time and other expenditures.

Methods of this kind, for determining a test subject's color type are known, for instance, from FR-A 1 347 400, U.S. Pat. No. 4,909,632 or EP-A 0 682 236, those known methods using, however, a plurality of different colors, as indicated above, thus rendering the selection considerably more difficult.

Moreover, it is disadvantageous with all of the known methods of this kind that the judgment of a suitable or appropriate color is effected by a third person independent of the person concerned or test subject, wherein the subjective color sensation of that third person, which naturally may decisively deviate from the color sensation of the person concerned, constitutes a substantial evaluation input and hence a large error source.

SUMMARY OF THE INVENTION

The present invention aims at providing a method for determining the color type of a test subject, which yields reliable results in a simple and quick manner. In addition, it is aimed at carrying out the method in a manner that the respective determination of a color type can be effected safely and correctly by persons carrying out the method without any subjective sensations of third persons being included. To solve this object, the method according to the invention for determining the color type of a test subject essentially is characterized in that the determination of the color type of the test subject is effected in several steps using in each step the mixed color containing different primary color portions, each in at least three graduations or color tones determined as a function of the respectively preceding method step with the exception of the first method step, in which color tones covering a wide range of the mixed color are employed. Since, according to the invention, the selection of color tones by the test subject and the subsequent determination of the test subject's color type resulting therefrom are effected on the basis of but a single mixed color, presenting to the test subject a plurality of color tones of that single mixed color for selection with the primary color portions contained in the mixed color differing accordingly, a relatively large and wide palette of different color tones of the mixed color employed may directly be presented to the test subject. It has, however, been observed that the presentation of but a relatively small number of different color tones of the mixed color employed and the respective deferred exchange with, or subsequent use of, alternative color tones of this mixed color will improve the results obtained by the test subject's eye being not overstrained or overstressed by an excessively large number of color tones of the mixed color present at the same time. In connection with such a presentation of a slight number of color tones each corresponding only to a partial range of, or excerpt from, the wide color palette available of the mixed color employed, it is, therefore, proposed according to the invention to effect the determination of the test subject's color type in several steps, using in each step the color containing different primary color portions each in at least three graduations or color tones determined as a function of the respectively preceding method step. In this multi-step process course as provided by the invention, it is, for instance, possible to present in a first step a small number of strongly contrasting color tones of the mixed color employed, whereupon, after selection by the test subject on the basis of the chosen color tone of the mixed color, the appropriate fine graduation of the color tone selected in the preceding method step of the mixed color employed is effected. Thus, it is feasible by relatively few method steps, and hence also within a very short period of time, to determine the color tone or graduation considered most pleasant by the test subject and to assess the color type on that basis.

In principle, a plurality of mixed colors may be employed for the determination of a color type, which colors are present within an accordingly wide spectrum or palette in a plurality of color tones or graduations, said color range usually extending from cool to warm color tones and from light to dark color tones in a manner analogous to the initially mentioned subdivision of the skin types in warm and cold types. In accordance with the invention, it is proposed to use green tones as the mixed color, since it has then found that the reflection of the counter color of the skin was the strongest when using green color tones and that the wrong selection of colors could be avoided most easily via green color tones.

This finding that the counter color of the skin is most strongly reflected via the green color may be utilized also to the effect that, after having determined the color type, partial regions of the skin of the test subject undertaking the determination of the color tone are irradiated with the color tone determined and the match between the determined color type and the irradiation result is verified, for instance, by comparative analysis, as in correspondence with a further preferred embodiment of the method according to the invention. After the respective color tone has been chosen by the test subject, it may thus be readily and simply checked in an objective manner whether the color tone selected by the test subject, and forming the basis of the determination of the color type, matches with the skin type of the test subject and whether an accordingly high degree of consistency may be obtained. If such a verification reveals an accordingly high degree of consistency, the method preferably may subsequently be conduced further in that the test subject after a, for instance, automated determination of the color type is irradiated with the color tones corresponding to the color type, of colors differing from the mixed color employed. Thereby it is, for instance, possible in a simple manner to directly determine and/or check, by irradiating parts of the facial skin, the effect of using cosmetic articles of the determined color type also in respect of many other colors of the whole color palette.

As already pointed out above, it is, thus, feasible to find out the test subject's color type by making a selection on the basis of but a single mixed color in various graduations or color tones, which selection is effected by the test subject alone without any influence by third persons, wherein, after the determination or assessment of the color type, appropriate partial ranges or color tones may then be automatically suggested for the other colors of the color spectrum. To this end, the invention preferably contemplates to proceed in a manner that, on the basis of the color type determined, the color tones of all colors, that correspond to the color type, are assessed for different applications such as, for instance, hair color, clothing, accessories, cosmetics, etc. According to the invention, the color tones corresponding to the determined color type, of all colors may thus be made available to a diversity of applications by the simple and time-saving assessment of the color type, using a single mixed color.

The present invention also relates to an arrangement for carrying out the method of determining the color type of a test subject. The arrangement according to the invention is essentially characterized by a device for providing or producing different color tones of a mixed color having different portions of primary colors and a device for inputting and evaluating the selection made of the desired color tone. Such a device according to the invention for providing or producing different color tones of a mixed color having different portions of primary colors may, for instance, be comprised of a device in which the different color tones of the mixed colors are provided in the form of differently colored foils or the like. As an alternative may be employed a screen having an appropriate chromatic resolution, on which the different color tones may be presented in an accordingly accurate and differentiating manner. By coupling with a device for inputting and evaluating the selection made, a slight number of colors, thus, may each be placed at the test subject's disposal for observation, whereupon, after having selected a color tone, a suitable further selection of different color tones is provided. In this respect, it is, furthermore, proposed that the device for producing color tones is coupled with a control or computation means which, after a first given color selection, effects further interrogation as a function of a selected color tone with a view to fine tuning, as in correspondence with a preferred embodiment of the embodiment according to the invention. By aid of such a control or computation means, it is feasible after the first range of the mixed color such as, for instance, green to realize an accordingly finer graduation for fine tuning each on the basis of the selection made.

In order to enable the verification or illustration of the result after the selection of the color tone and determination of the color type on the basis of the configuration effected by the test subject, it is, moreover, proposed in a preferred manner to further provide a device for producing the predetermined color tone for irradiating a partial region of the skin of the test subject and for verifying the consistency of the color type determined with the irradiation result. Such a device in a simple manner may be comprised of a lamp combined with suitable filters, wherein the verification of the consistency of the color type determined with the irradiation result may be carried out by aid of appropriate detection means and sensors and optionally mirrors. Irradiation in that case may be effected not only in the green tone, selected in order to obtain an accordingly strong reaction of the reflection of the counter color by the skin, as already pointed out above, but also with the color tones of other colors, that correspond to the color type determined, in order to be able to directly check and illustrate the effect of other colors of the color type traced. In this connection, it is, moreover, proposed to provide a selection device which, as a function of the color type determined, calculates and outputs the respective color tones of colors differing from the mixed color employed, with a view to different applications such as, for instance, hair color, clothing, cosmetics, etc., as in correspondence with another preferred embodiment of the arrangement according to the invention.

In the following, the invention will be described in more detail by way of an exemplary embodiment of the arrangement, according to the invention, for carrying out the method of the invention, which is illustrated in more detail in the annexed drawing.

DETAILED DESCRIPTION OF THE INVENTION

The drawing schematically depicts a block diagram of an arrangement for determining the color type of a test subject. The arrangement comprises a device 1 for producing different color tones of a single mixed color such as, for instance, green, with a slight number of color tones 8 containing different primary color portions being presented on a screen 2. In the embodiment illustrated, three color tones or graduations 8 of the mixed color employed are, for instance, shown and, after the presentation of this first set of tine selections covering a wide range of a mixed color the selection of a color, tone felt to be the most pleasant one by the test subject is carried out on a selection device or keyboard 3. Based on that first selection, further color tones 8, covering a closer partial range about the selection made in the first method step, are produced in the device 1 using a schematically indicated control or computation means 4 such that the appropriate fine tuning and hence final selection of a color tone of the only mixed color employed will be effected by the test subject via such a sequence of steps using only a few steps.

After the selection of a color tone 8 and the assessment of the test subject's color type by the control or computation means 4 on the basis thereof, partial regions of the test subject's skin such as, for instance, partial regions of his/her face are irradiated with the color tone selected by the test subject from a radiation source 5. With the aid of a schematically indicated sensor or suitable detection unit 6, via the data stored in the control and computation means 4, verification and determination are effected as to whether the selection made by the test subject and, based thereon, the assessment of the color type are consistent, or largely congruent, with the test subject's skin type to be ascertained objectively. At the same time, the subjective observation of the face irradiated with the color tone by the test subject is feasible in order to be able to optionally interrogate and/or examine closely adjacent color types going beyond the color type determined.

In case such an irradiation of partial regions of the test subject's skin and the subsequent analysis and verification thereof reveal a significant discrepancy between the color or color tone 8 selected by the test subject and the skin type or, generally, color type of the test subject determined during irradiation, the selection procedure may be restarted via the control or computation means 4. When restarting the test subject will be presented with a limited selection of color shades as a function of the verification of the skin type such that, based on the selection made by the device 1 and the control or computation means 4, a correct result may be expected with an even smaller number of method steps involved.

In addition to an irradiation with the color tone corresponding to the color type, of the mixed color, an irradiation with color tones, corresponding to the color type of the test subject, of other colors may be realized if suitable irradiation devices 5 are provided, for instance, by using appropriate filters, in order to directly visualize, by observation through a mirror, the effects and influences of other colors, too.

Furthermore, 7 denotes a selection and output means by which the respective color tones of all colors may be issued as a function of the color type determined, with a view to different applications such as, for instance, hair color, clothing, accessories, cosmetics, interior design or the like.

We claim:

1. A method for determining the color type of a test subject, comprising the steps of:
    displaying, to the test subject, a plurality of color tones within a range of a mixed color, each of said plurality of color tones having a different amount of primary color portions contained therein;
    selecting, by the test subject, one of said plurality of color tones as a selection;
    computing, as a function of the selection, a next plurality of color tones for display to the test subject, the next plurality of color tones representing, in primary color portions, a closer partial range of the mixed color about the selection;
    repeating the steps of selecting and computing, with each next plurality of color tones displayed representing a closer partial range of the mixed color about a respectively preceding selection, until a final color tone is selected;
    determining, based on the final color tone, a color type of the test subject.

2. The method according to claim 1, wherein green tones are used as the mixed color.

3. The method according to claim 1, wherein, after having determined the color type, the method further comprises the steps of:
    irradiating partial regions of skin of the test subject with the final color tone to derive an observed color type;
    comparing the determined color type with the observed color type to verify congruence.

4. The method according to claim 3, further comprising the step of:
    irradiating the test subject with color tones, corresponding to the determined color type of the test subject, of colors differing from the mixed color.

5. The method according to claim 1, further comprising the step of:
    assessing, on the basis of the determined color type, color tones, corresponding to the determined color type, of colors other than the mixed color for use in at least one of hair color, clothing, cosmetics and interior design applications.

6. The method according to claim 3 further comprising, after the step of comparing, the steps of:
    determining a lack of congruence between the determined color type and the observed color type;
    displaying, to the test subject, a limited plurality of color shades, as a function of the observed color type;
    selecting, by the test subject, one of said limited plurality of color shades as a shade selection;
    computing, as a function of the shade selection, a next limited plurality of color shades for display to the test subject, the next limited plurality of color shades representing, in primary color portions, a closer partial range of the mixed color about the shade selection;
    repeating the steps of selecting and computing, with each next limited plurality of color shades displayed representing a closer partial range of the mixed color about a respectively preceding shade selection, until a final color shade is selected;
    determining, based on the final color shade, a color type of the test subject.

7. The method according to claim 1, wherein the step of displaying the plurality of color tones includes displaying at least three color tones to the test subject.

8. An arrangement for determining the color type of a test subject comprising:
    a device having control means for producing a range of color tones of a mixed color, each of said color tones having a different amount of primary color portions contained therein, said device including a screen for displaying a plurality of said color tones to a test subject;
    means, coupled to said control means, for inputting, by the test subject, a selection of one of the plurality of color tones;
    said control means for producing, as a function of the selection, a next plurality of color tones for display on the screen, the next plurality of color tones representing a closer partial range of the mixed color about the selected color tone, said control means for computing, responsive to each subsequent selection, tones within a closer partial range of the mixed color, said control means for determining, using a final color tone selection, a color type of the test subject.

9. The arrangement according to claim 8, wherein the the mixed color comprises green tones.

10. The arrangement according to claim 8, further comprising:
- a radiation source, coupled to said device, for irradiating partial regions of skin of the test subject with the final selected color tone to derive an observed color type; and
- a sensor unit, coupled to said device, for determining congruity between the determined color type and the observed color type.

11. The arrangement according to claim 8, further comprising selection and output means, coupled to said device, for issuing, as a function of the determined color type respective color tones of colors differing from the mixed color employed, with a view to different applications including at least one of hair color, clothing, cosmetics and interior design.

12. A method for determining the color type of a test subject, comprising the steps of:
- (a) presenting, to the test subject, a set of at least three color tones within a range of a mixed color, each of said color tones having a different amount of primary color portions contained therein;
- (b) selecting, by the test subject, one of said color tones from the set as a selection;
- (c) displaying, as a function of the selection, a next set of at least three color tones, the next set of color tones representing, in primary color portions, a closer partial range of the mixed color about the selection;
- (d) selecting, by the test subject, one of said color tones from the next set as a last selection; and
- (e) determining, based on the last selection, a color type of the test subject.

13. The method according to claim 12, further comprising, before step (e), the steps of:
- repeating steps (c) and (d), with each next set of color tones being displayed as a function of a respectively preceding selection and representing a closer partial range of the mixed color about the respectively preceding selection, until a final color tone is selected; and
- repeating step (e), with the color type of the test subject being determined based on the final color tone selected.

14. The method according to claim 13, further comprising the steps of:
- (f) irradiating partial regions of skin of the test subject with the final color tone to derive an observed color type;
- (g) comparing the determined color type with the observed color type to verify congruence.

15. The method according to claim 12, further comprising, after step (e), the steps of:
- (f) irradiating partial regions of skin of the test subject with the color tone corresponding to the last selection to derive an observed color type;
- (g) comparing the determined color type with the observed color type to verify congruence.

16. The method according to claim 15, further comprising, after step (g), the steps of:
- repeating steps (c) and (d), with each next set of color tones being displayed as a function of a respectively preceding selection and representing a closer partial range of the mixed color about the respectively preceding selection, until a final color tone is selected; and
- determining, based on the final color tone selected, a final color type of the test subject.

17. The method according to claim 16, further comprising the steps of:
- irradiating partial regions of skin of the test subject with the final color tone to derive a final observed color type;
- comparing the final determined color type with the final observed color type to verify congruence.

* * * * *